UNITED STATES PATENT OFFICE.

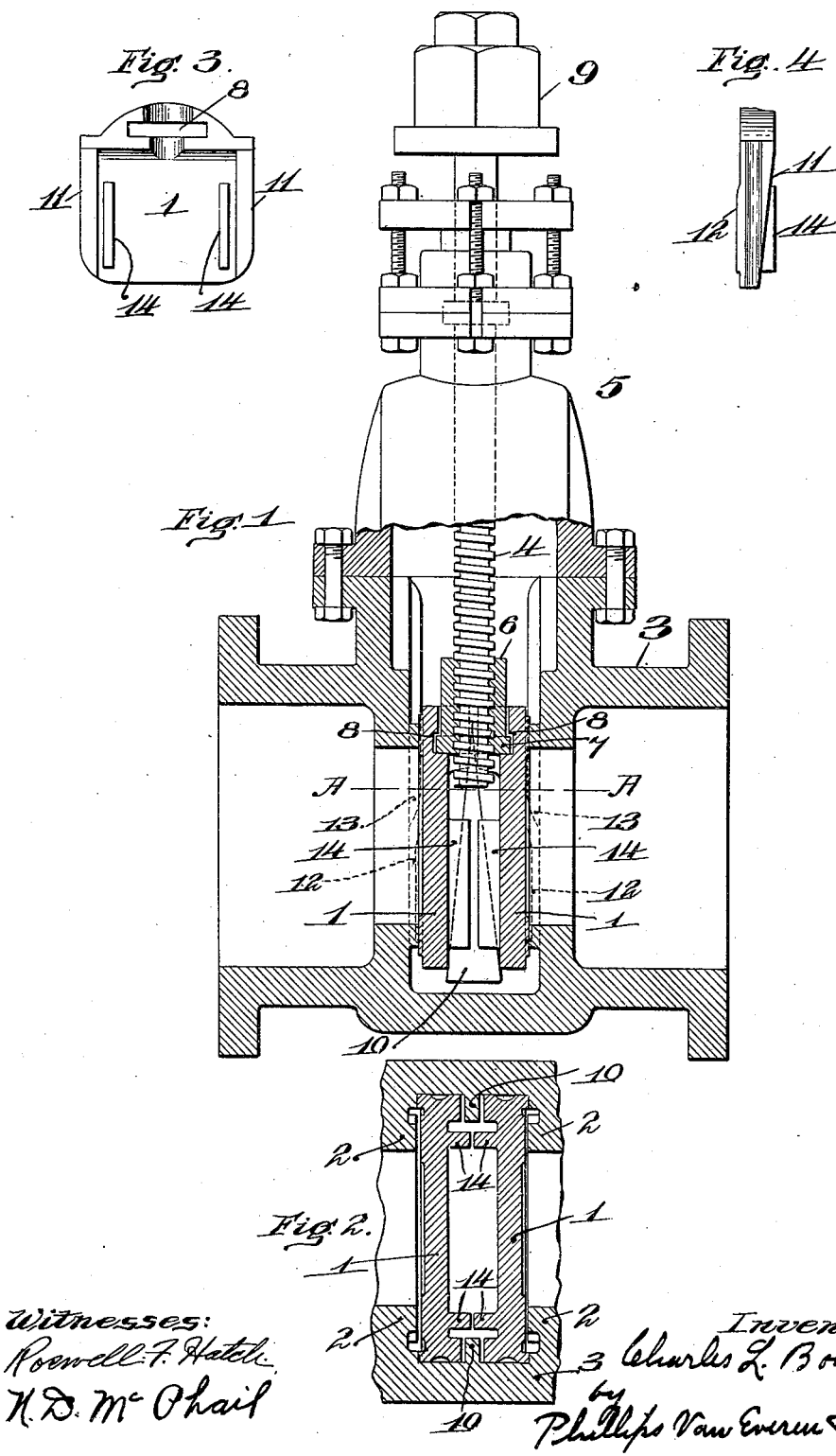

CHARLES L. BOWKER, OF BRUNSWICK, MAINE.

GATE-VALVE.

991,690.  Specification of Letters Patent.  Patented May 9, 1911.

Application filed April 9, 1910. Serial No. 554,333.

*To all whom it may concern:*

Be it known that I, CHARLES L. BOWKER, a citizen of the United States, residing at Brunswick, in the county of Cumberland and State of Maine, have invented certain new and useful Improvements in Gate-Valves; and I do hereby declare the following to be a full, clear, and exact description of the invention, such as will enable others skilled in the art to which it appertains to make and use the same.

The present invention relates to certain new and useful improvements in gate valves. This class of valves is characterized by the employment of one or more movable valve disks mounted to slide vertically between opposing valve seats to open or close the valve as desired.

The object of my invention is to provide improved means for forcing the valve disks into engagement with their respective seats when the valve is closed without obstructing the flow through the water-way when the valve is open.

A further object of my invention is to provide means for positively forcing the valve disks away from the valve seats upon the opening of the valve.

The preferred form of my invention will be clearly understood from an inspection of the accompanying drawing, in which—

Figure 1 represents an elevation of my improved valve with a portion of the casing removed and the valve mechanism shown in section; Fig. 2 shows a transverse section of the valve disks and seats taken on the line A—A, Fig. 1; Fig. 3 is a detail view showing one of the valve disks in front elevation; and Fig. 4 is a view similar to Fig. 3 showing the disk in side elevation.

My improved valve is of that type commonly known in the art as gate valves, and comprises a pair of sliding disks 1 operating between oppositely disposed valve seats 2. These valve seats may be of any non-corrosive material, such as bronze, and may be suitably secured in the valve casing 3. The valve disks 1 are raised and lowered through the usual type of mechanism which consists in a screw 4 passing through a stuffing box 5 which is bolted to the valve casing 3, the screw 4 having a nut 6 threaded upon its lower end. The nut 6 has a flange 7 which engages with the recesses 8 in the upper part of the valve disks 1. The screw 4 is provided with a hexagonal head 9 by means of which it may be rotated to raise or lower the nut 6 and disks 1 and thus open or close the valve.

It has been found in practice that it is necessary to provide means for positively forcing the valve disks into engagement with their respective seats when the disks register with the seats. The improved means which I provide for forcing the valve disks into engagement with the seats consists of a pair of wedge shaped ribs 10 which are arranged vertically upon opposite sides of the valve chamber, and are preferably cast integrally with the valve casing. The valve disks are provided upon their inner faces with inclined surfaces 11 which engage with the faces of the wedge shaped ribs and force the valve disks apart and into contact with the valve seats. The valve chamber is of sufficient size to permit the wedge shaped ribs to be properly contained therein without the ribs projecting out into the water-way and obstructing the flow through the same. It will be noted that by the above arrangement I am also enabled to provide a gradual taper of the wedge shaped ribs. This feature is of considerable importance as a far more powerful pressure can be exerted to force the valve disks against their seats than could be obtained by a short wedge such as would be necessary if the wedge shaped ribs were located at the bottom of the water-way and projected upwardly into the same.

This type of valve is generally employed in places where a considerable pressure is exerted upon the valve disks, and where relatively large quantities of water are being handled and it will therefore be seen that it is necessary to employ means for exerting a considerable pressure to force the valve disks against their seats in order that a proper contact between the same, and complete closing of the valve, may be obtained.

The valve disks are forced away from the valve seats upon upward movement of the disks when the valve is open, by the engagement of lugs 12 on the outer faces of the disks with cam guides or ribs 13 (shown in dotted lines in Fig. 1) vertically arranged upon the sides of the valve casing in the valve chamber opposite the lugs. The cam guides or ribs are cut away flush with the surface of the valve seat at a point about midway between the top and bottom of the valve chamber, thus obtaining the cam effect.

The valve disks are provided upon their inner faces with a plurality of spacing lugs 14 which hold the disks at a predetermined distance apart and serve to keep the disks in their proper relative positions when they are raised.

Having explained the nature and object of the invention, and specifically described one form of gate valve in which it may be embodied, what I claim is:—

A gate valve, having, in combination, a valve casing, oppositely disposed valve seats in the casing, a valve chamber between said valve seats, valve disks in the valve chamber provided with inclined surfaces on their inner faces, wedge-shaped ribs arranged vertically in said valve chamber on opposite sides of the water-way and coöperating with the inclined surfaces upon the valve disks to force the disks against their seats when the disks are lowered, and means located upon opposite sides of the valve chamber operating to force the valve disks away from their seats as the disks are raised, substantially as described.

CHARLES L. BOWKER.

Witnesses:
CHARLES I. GIVEN,
JOHN R. STANWOOD.

Copies of this patent may be obtained for five cents each, by addressing the "Commissioner of Patents, Washington, D. C."